(12) United States Patent
Diehl et al.

(10) Patent No.: US 8,830,318 B2
(45) Date of Patent: Sep. 9, 2014

(54) ON-VEHICLE THREE-DIMENSIONAL VIDEO SYSTEM AND METHOD OF MONITORING THE SURROUNDING ENVIRONMENT OF A VEHICLE USING THE SAME

(75) Inventors: Peter G. Diehl, Shanghai (CN); Sam Yang, Shanghai (CN); Li Shen, Shanghai (CN); Huan Lu, Shanghai (CN)

(73) Assignee: GM Global Technology Operations LLC, Detroit, MI (US)

( * ) Notice: Subject to any disclaimer, the term of this patent is extended or adjusted under 35 U.S.C. 154(b) by 271 days.

(21) Appl. No.: 12/910,420

(22) Filed: Oct. 22, 2010

(65) Prior Publication Data
US 2011/0102552 A1    May 5, 2011

(51) Int. Cl.
*H04N 7/18* (2006.01)
*B60R 1/00* (2006.01)
*H04N 13/02* (2006.01)

(52) U.S. Cl.
CPC .......... *H04N 7/181* (2013.01); *B60R 2300/207* (2013.01); *B60R 1/00* (2013.01); *B60R 2300/107* (2013.01); *H04N 13/0239* (2013.01)
USPC ............................................ 348/148; 348/47

(58) Field of Classification Search
CPC .................... G08B 13/19641; G08B 13/19647
USPC ..................................................... 348/47, 148
See application file for complete search history.

(56) References Cited

U.S. PATENT DOCUMENTS

| 5,414,461 | A | * | 5/1995 | Kishi et al. | .................. | 348/115 |
| 5,737,655 | A | * | 4/1998 | Inaba | ............................. | 396/324 |
| 5,864,360 | A | | 1/1999 | Okauchi et al. | | |
| 6,144,296 | A | * | 11/2000 | Ishida et al. | .................. | 340/461 |

(Continued)

FOREIGN PATENT DOCUMENTS

| CN | 1287532 A | 3/2001 |
| CN | 1541865 A | 11/2004 |

(Continued)

OTHER PUBLICATIONS

State Intellectual Property Office of the P.R.C., Office Action for Chinese Patent Application No. 200910221173.5, mailed Aug. 14, 2012.

(Continued)

*Primary Examiner* — Sath V Perungavoor
*Assistant Examiner* — Jeffery Williams
(74) *Attorney, Agent, or Firm* — Ingrassia Fisher & Lorenz, P.C.

(57) ABSTRACT

An on-vehicle three-dimensional video system is provided for a vehicle and a method is provided for monitoring a surrounding environment of a vehicle. The on-vehicle three-dimensional video system includes, but is not limited to cameras, a display screen, a control module, and a power supply device. The cameras are provided in pairs for filming the surrounding environment of the vehicle from different angles, and the display screen is able to bring about a three-dimensional video effect according to pairs of video signals from the cameras. With the on-vehicle three-dimensional video system, a realistic three-dimensional output of the surrounding environment of the vehicle is realized on the display screen so that the driver can clearly know about the precise relative position of a corresponding portion of the vehicle with respect to the surrounding environment.

20 Claims, 4 Drawing Sheets

(56) References Cited

U.S. PATENT DOCUMENTS

| | | | |
|---|---|---|---|
| 6,259,359 B1 * | 7/2001 | Fujinami et al. | 340/435 |
| 6,535,242 B1 | 3/2003 | Strumolo et al. | |
| 6,710,774 B1 * | 3/2004 | Kawasaki et al. | 345/419 |
| 7,190,389 B1 | 3/2007 | Abe et al. | |
| 2003/0085806 A1 * | 5/2003 | Samman et al. | 340/435 |
| 2004/0257211 A1 | 12/2004 | Kudo | |
| 2005/0190180 A1 | 9/2005 | Jin et al. | |
| 2005/0240342 A1 | 10/2005 | Ishihara et al. | |
| 2007/0206835 A1 | 9/2007 | Abe | |
| 2008/0122799 A1 * | 5/2008 | Pryor | 345/173 |

FOREIGN PATENT DOCUMENTS

| | | |
|---|---|---|
| CN | 1922894 A | 2/2007 |
| CN | 101085608 A | 12/2007 |
| CN | 101088027 A | 12/2007 |
| CN | 101409019 A | 4/2009 |
| FR | 2902381 B1 | 11/2008 |
| JP | 2005167309 A | 6/2005 |

OTHER PUBLICATIONS

State Intellectual Property Office of the P.R.C., Office Action for Chinese Patent Application No. 200910221173.5, mailed May 13, 2013.

Santarini, Mike, Xcell Journal, vol. 31, 2008 (Reference D3 is from the State Intellectual Property Office of the P.R.C., Office Action for Chinese Patent Application No. 200910221173.5, mailed Aug. 14, 2012.

Explanation of Reference D3 (Mike Santarini, Xcell Journal, vol. 31, 2008) as cited in the State Intellectual Property Office of the P.R.C., Office Action for Chinese Patent Application No. 200910221173.5, mailed Aug. 14, 2012.

* cited by examiner ably display the surrounding environment of vehicle, especially display a three-dimensional realistic sense of distance between the vehicle and surrounding environment, thus facilitating astern-running, parking and other operations associated with the surrounding environment of vehicle, which need to be addressed in the field.

ON-VEHICLE THREE-DIMENSIONAL VIDEO SYSTEM AND METHOD OF MONITORING THE SURROUNDING ENVIRONMENT OF A VEHICLE USING THE SAME

CROSS-REFERENCE TO RELATED APPLICATION

This application claims priority to Chinese Patent Application No. 200910221173.5, filed Nov. 2, 2009, which is hereby incorporated by reference in its entirety.

TECHNICAL FIELD

In general, the technical field relates to an on-vehicle display system and a method of monitoring the surrounding environment of a vehicle using the same. In particular, the technical field relates to an on-vehicle video display system and a method of monitoring the surrounding environment of a vehicle using the same.

BACKGROUND

To aid in observing the surrounding environment of a vehicle, rear-view mirrors, an astern-running radar, a video system and/or the like are often provided on motorized vehicles such as cars, trucks and buses.

Rear-view mirrors reflect the conditions behind, beside and under the vehicles so that the driver can clearly know about the conditions indirectly through these rear-view mirrors, thus expanding the field of view for the driver. A disadvantage of the rear-view mirrors is the existence of blind area of view as well as a dazzled feeling caused when the light from head lights of a vehicle behind is reflected by rear-view mirrors of the subject vehicle while driving in the evening, thereby hazarding the driving safety. Furthermore, the rear-view mirrors fail to correctly reflect the actual situation lower behind the vehicle when astern-driving.

An astern-running radar system is a safety assistant apparatus used in parking or astern-driving, and can inform the driver of the conditions of the surrounding obstacles with a sound or with a screen display that is more intuitive. However, the astern-running radar system is also prone to cause the problem of visually blind area. Due to the installation position of a radar probe, the astern-running radar will fail to function when the obstacles behind the vehicle are over high, overflow or their angles are beyond the detecting range of the probe.

A video system employs cameras mounted on both sides and the rear portion as well as other portions of the vehicle, and a liquid crystal display (LCD) screen inside the vehicle, thus enabling a clear display of images of the surrounding environment of vehicle filmed by the cameras on the LCD screen. For example, Utility Model Announcement No. CN201074544Y, which was announced the granting of patent right on Jul. 15, 2009 and entitled "an on-vehicle rear-view system", discloses an on-vehicle rear-view system comprising a LCD screen and a plurality of cameras, both of which are connected to a controller to realize a multi-channel video input. The LCD screen clearly displays images and the controller is used for switching the displayed pictures. A disadvantage of this on-vehicle rear-view system lies in that the image displayed on the display screen each time is a two-dimensional image filmed by a single camera, or that the images displayed on each display portion of the display screen each time is a two-dimensional image filmed by a single camera. An illusion of distance feeling on the objects of the two-dimensional images is caused by a combination of lights and shadows. Actually, the distance between a vehicle and an object sensed from the two-dimensional image display is incorrect.

Therefore, embodiments of the invention provide a video system which can clearly and actually display the surrounding environment of vehicle, especially display a three-dimensional realistic sense of distance between the vehicle and surrounding environment, thus facilitating astern-running, parking and other operations associated with the surrounding environment of vehicle, which need to be addressed in the field.

At least one objective of the invention is to provide an on-vehicle three-dimensional video system that eliminates the above disadvantages of the prior art. In addition, other objectives, desirable features and characteristics will become apparent from the subsequent summary and detailed description, and the appended claims, taken in conjunction with the accompanying drawings and this background.

SUMMARY

According to an embodiment of the invention, an on-vehicle three-dimensional video system is provided. The system comprises cameras, and a display screen, a control module in communication with the cameras and the display screen, and a power supply device electrically connected to the cameras, the display screen and the control module to supply power therefore, which are provided on the vehicle.

The cameras are provided in pairs for filming the surrounding environment of vehicle from different angles; the control module acquires, calculates, processes, stores and controls video information from the cameras and transmits the processed video information to the display screen so that the display screen can display a three-dimensional video according to the video information.

With the on-vehicle three-dimensional video system, a realistic three-dimensional output of the surrounding environment of vehicle can be realized on the display screen, so that the driver can clearly know about the exact relative position of a corresponding portion of the vehicle with respect to the surrounding environment and undesired accidents can be effectively prevented.

Optionally, in the on-vehicle three-dimensional video system according to the aspect of the invention, the distance between the pair of cameras is from approximately 5 cm to approximately 8 cm. Optionally, in the on-vehicle three-dimensional video system according to the aspect of the invention, the distance between the pair of cameras is about 6.35 cm. The effect of outputting a three-dimensional video can be effectively improved by setting the distance between the cameras in the above-described way.

Optionally, in the on-vehicle three-dimensional video system according to an embodiment of the invention, the distance between the pair of cameras is adjustable. The quality of video output can be adjusted in different situations by adjusting the distance between the cameras, thereby realizing a best display effect of the display screen.

Optionally, in the on-vehicle three-dimensional video system according to an embodiment of the invention, the display on the display screen can be switched between a two-dimensional video display and a three-dimensional video display.

Optionally, in the on-vehicle three-dimensional video system according to an embodiment of the invention, the display on the display screen can be switched among the three-dimensional videos filmed by different pairs of cameras. Videos of different positions in the surrounding environment of vehicle can be effectively output through such a switch.

Optionally, in the on-vehicle three-dimensional video system according to an embodiment of the invention, at least one pair of the pairs of cameras is located in the rear of the vehicle. The driver can exactly know about the environmental situations behind the vehicle through the display screen by positioning cameras in the rear of vehicle, thereby effectively performing relevant operations such as astern-running, parking.

Optionally, in the on-vehicle three-dimensional video system according to an embodiment of the invention, the display screen automatically displays the videos filmed by cameras located in the rear of vehicle when the vehicle is in an astern-running state. This makes astern-running of the vehicle much easier.

Optionally, in the on-vehicle three-dimensional video system according to the aspect of the invention, the display screen can be used as a display screen for an on-vehicle DVD.

According to another embodiment of the invention, a method of monitoring the surrounding environment of vehicle by using an on-vehicle three-dimensional video system as described in the above aspect of the invention is provided. The method comprises: filming the surrounding environment of vehicle from different angles by using cameras provided in pairs; acquiring, calculating, processing, storing and controlling video information from the cameras by using a control module; and transmitting the processed video information to a display screen to display a three-dimensional video on the display screen according to the video information.

BRIEF DESCRIPTION OF DRAWINGS

It should be understood that the appended drawings are for illustrative purpose only and are not intended to limit the scope. The drawings are not necessarily drawn in actual scale and some features may have been enlarged in order to show particular details. Moreover, like components or devices are given like reference signs. The forgoing and other objectives, features and advantages will become apparent from the following detailed description of preferred embodiments of the invention in conjunction with the drawings. In the drawings.

DETAILED DESCRIPTION

A particular embodiment of an on-vehicle three-dimensional video system according to the invention will be described in detail with reference to the drawings hereinafter. It should be understood that various features can be re-combined, modified to obtain more different embodiments, all of which undoubtedly fall within the scope of protection of the invention, by those skilled in the art according to the forgoing and the following technical solutions without changing the general concept of the embodiments of invention. Therefore, the following description of the on-vehicle three-dimensional video system made in conjunction with the drawings is illustrative and by way of example only, and should not be considered to limit the scope or technical solutions in any way.

Figure 1:
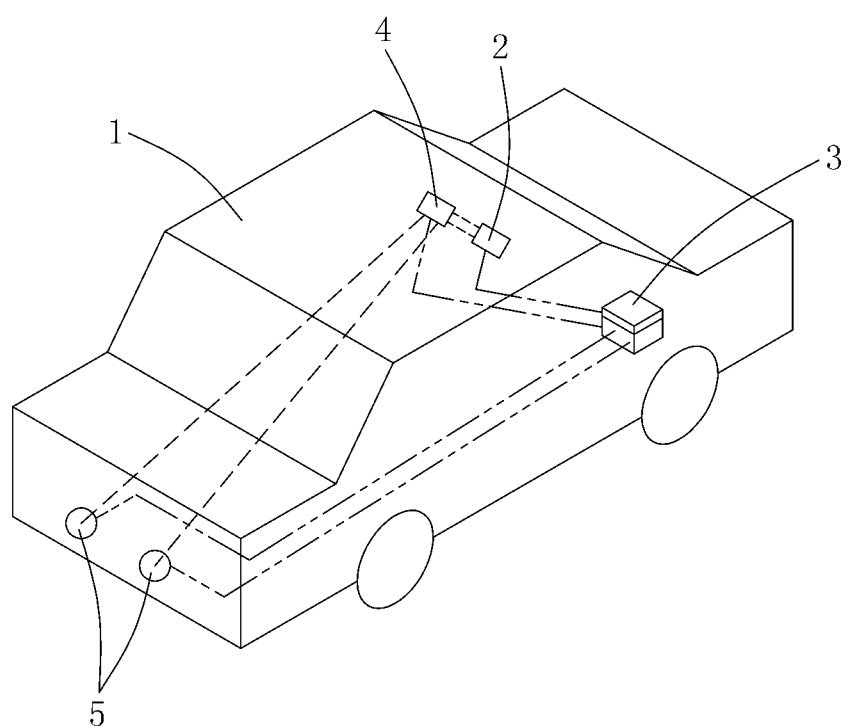
FIG. 1 is a view schematically showing the constitutive structure of an embodiment of an on-vehicle three-dimensional video system according to an embodiment of the invention.

FIG. 1 is a view schematically showing the constitutive structure of an embodiment of an on-vehicle three-dimensional video system according to an embodiment of the invention. As can be seen in FIG. 1, the on-vehicle three-dimensional video system 1 comprises a display screen 2, a control module 4, a power supply device 3 and cameras 5 provided in pairs. The display screen 2 and the pairs of the cameras 5 are respectively in communication with the control module 4 via communication cables. Various communication cables are shown in FIG. 1 in dotted lines. The cameras 5, the display screen 2 and the control module 4 are each electrically connected to the power supply device 3 through conductive wires to be supplied with power by the power supply device 3. Various conductive wires are shown in FIG. 1 in double dotted lines.

In this embodiment, the pairs of cameras 5 are arranged in the rear of the vehicle to film the surrounding environment of the area behind the vehicle. The display screen 2 is provided at the console panel of the cab for facilitating the driver in observing the situation behind the vehicle when driving, astern-driving or parking. The control module 4 may be provided adjacent to the display screen 2 so as to be near to the operator and convenient for adjusting, or provided adjacent to a radio module in the front of the vehicle for facilitating adjusting and handling of video signals by the operator and preventing video signals from being disturbed by external interfering source. Moreover, position of the control module 4 adjacent the radio facilitates the adjustment of the display of on-vehicle DVD. The power supply device 3 may also be provided adjacent to the radio module in the front of the vehicle so as to directly power the display screen 2 and control module 4 and reduce disturbance from external signals and circuit consuming while keeping the power supply clean and reliable. Although the positions where various devices are mounted in the vehicle are described above by way of example, those skilled in the art will appreciate that the positions of those devices are illustrative only; in practical situation, a designer may install those devices at other desired positions as actually needed.

The pairs of cameras 5 are spaced apart from each other at a certain distance. That is, each of the cameras 5 is neither provided at the same position of the vehicle body nor spaced too faraway from each other. For example, the distance between a pair of two cameras may be a value within the range of approximately 5 cm to approximately 8 cm; preferably, the distance between a pair of two cameras may be a value within the range of approximately 6.2 cm to approximately 6.5 cm; more preferably, the distance between a pair of two cameras may be approximately 6.35 cm. With this arrangement, the two cameras of a pair of cameras have an overlapping filming range, thus enabling filming the same environmental scenery from different angles respectively. The two cameras perform the filming independent of each other. Those skilled in the art may envisage that a three-dimensional video effect will be realized after the filmed images and videos respectively enter two eyes of the observer.

The pairs of cameras 5 are respectively in communication with the control module 4 through communication cables. More specifically, the pairs of cameras 5 are in communication with a Random-access memory (RAM) 10 (see FIG. 4) in the control module 4, so as to transmit videos filmed by cameras 5 to the RAM 10, which, in combination with a micro control unit (MCU) 11 and an image processing module 12, performs calculation, process, store, control and display. The description of the RAM 10, the MCU 11 and the image processing module 12 in the control module 4 will be given in detail later in the specification.

The video signals of the videos filmed by the pairs of cameras 5 are transmitted to the display screen 2 through respective communication cables after being processed by the control module 4. The display screen 2 can regenerate the video signals generated from the videos filmed by the two cameras 5 into a three-dimensional video to be further reflected into the eyes of observer, thereby simulating a course how human eyes view an actual three-dimensional object and achieving the same effect. The operation principle will be described in detail with reference to FIG. 3 hereinafter. The individual communication paths through which the video signals acquired by the pairs of cameras 5 are transmitted to the display screen 2 can be switched so as to permit cutting off or temporarily interrupting the signal in certain cable separately, so that the display screen 2 may display the video output filmed by only one camera, which is similar to the two-dimensional video output in the prior art. When the communication of said cable is on and other cables are cut off, the two-dimensional video on the display screen 2 can be switched into a two-dimensional video filmed from another angle by another camera. Optionally, those skilled in the art may position switch devices on the control module 4 or integrate them with the display screen 2, and conveniently perform the switching of videos through corresponding means such as buttons. The display screen can be the Fuji FinePix REAL 3D V1 type of screen produced by the Fujifilm Corporation, or other appropriate display screen.

As stated above, the control module 4 is in communication with the cameras 5 and display screen 2 respectively for controlling the same. The control module 4 includes the RAM 10, the MCU 11 and the image processing module 12. The MCU 11 is in direct communication with the RAM 10 and is in communication with the image processing module 12. The RAM 10, the MCU 11 and the image processing module 12 collectively calculate, process, store, control and display the videos filmed by the cameras 5.

The RAM 10 functions as a cache, which is adapted to store data and program being used (being executed). It is well known that modern RAMs can realize an extremely high speed of access and is thus adapted to the on-vehicle video system 1 according to the invention. The signals of videos filmed by the cameras 5 firstly enter the cache through communication cables and are finally transmitted to the display screen 2 of the on-vehicle video system after being calculated and processed by the MCU 11.

The power supply device 3 may also be arranged at other positions of the vehicle. The power supply device 3 is electrically connected to the cameras 5, the display screen 2 and the control module 4 through cables so as to supply power to the cameras 5, the display screen 2 and the control module 4.

As can be known from the above detailed description, in the above embodiment according to the invention, the communication between the cameras and the control module and the communication between the display screen and the control module and the communication inside the control module between the RAM and the MCU are realized through communication cables; the electrical connection between the power supply device and the cameras, and the electrical connection between the display screen and the control module are realized through conductive wires. These associated devices and cables/wires can constitute the three-dimensional video system of the above embodiment according to the invention.

The situation in which the system 1 is used as a rear-view three-dimensional video system is mainly described above. However, it will be noted that the on-vehicle three-dimensional system 1 may also be applied to situations in which the surrounding environment of the vehicle in other directions is observed and other situations that requires certain display. In these situations, it is only required to arrange pairs of cameras at other desired positions in a way as described above and set the cameras into valid communication with the display screen in a way as described. It will be noted that the term "surrounding environment" of the vehicle does not necessarily indicate the environment of the periphery of the vehicle, the cameras may also be positioned inside the vehicle body or in the trunk. This facilitates the operator to know about the conditions of items inside the vehicle body or the trunk when sitting in the driving position with the aid of light, etc. In the situation where plurality pairs of cameras are provided, the three-dimensional video display of the surrounding environment of the vehicle on the display screen can be switched through switching the communication between the cameras and the display screen.

While particular technical features are specifically defined in the above embodiment of the invention, in practical application, those skilled in the art may implement the invention in other similar ways as described below on the basis of the invention. These similar ways all fall within the scope of protection of the invention undoubtedly. For example, valid wireless communication can be used in practical application to perform data communication, thereby effecting wireless video communication. The positions of various components or devices of the invention inside the vehicle can be changed. For example, a display screen or pairs of cameras may also be additionally provided at other positions of the vehicle. Alternatively, the display screen or pairs of cameras are only provided at said other positions, as actually needed. The control module 4 may be provided at other positions where the designer considers to be more adapted for operator operating; the power supply device 3 may also be positioned at other more advantageous positions inside the vehicle; the distance between the pairs of cameras 5 is adjustable, for example, between 5 cm and 8 cm; in some cases, the video switch of the display screen 2 can be set to be automatically controlled, for example, the video of the display screen 2 is switched to rear-view mode when astern-driving.

In addition, the devices such as the control module, the display screen and the power supply module of the on-vehicle three-dimensional video system 1 are not necessarily provided independently, and they can also be shared with other systems or devices of the vehicle. For example, the control module may also control the operation of an on-vehicle DVD. Similarly, the display screen may also be used as the display screen of the on-vehicle DVD. When the data source of the DVD is two-dimensional video data, a two-dimensional video output will be displayed on the display screen; when the data source of the DVD is a three-dimensional video data source according to the above embodiment of the invention, a three-dimensional video output will be displayed on the display screen. It will be noted that the video output in this application also includes an output in image format.

Figure 2:
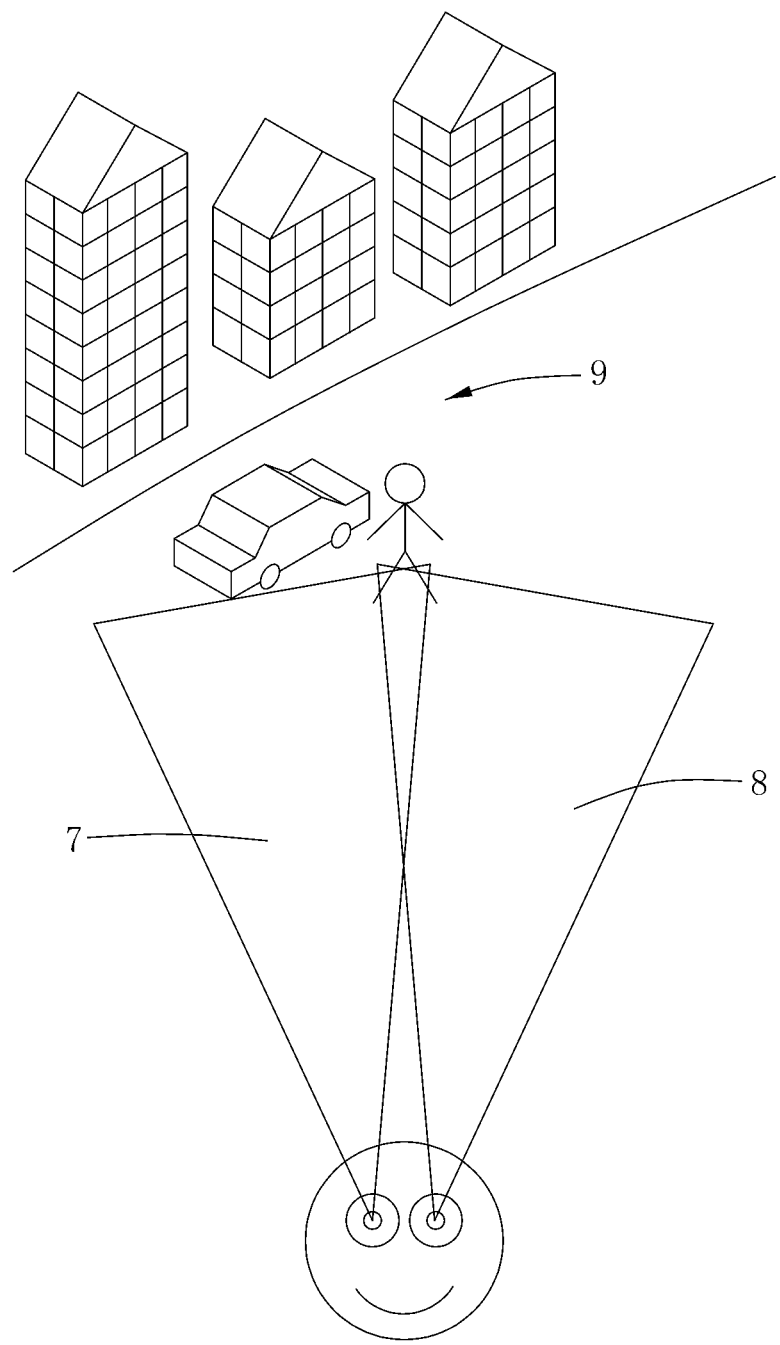
FIG. 2 schematically shows how human eyes observe a three-dimensional object.

The operation principle of the invention will be described in brief with reference to FIGS. 2-4. FIG. 2 schematically shows how human eyes observe a three-dimensional object.

In daily life, the vision target viewed by both eyes of human is a combination of two vision images 7 and 8 from the left and right eyes. Reference sign 9 in FIG. 2 indicates the surrounding environment of vehicle viewed by human eyes, such as road conditions. The characteristic of the two vision images viewed by the left and right eyes lies in that they are not only different from each other, but cover the same range of vision images, and reflect the vision target in front of eyes from different angles. After receiving the two vision images, the brain processes and combines the identical range of vision images so that the human can sense a three-dimensional vision image with a sense of distance.

Figure 3:
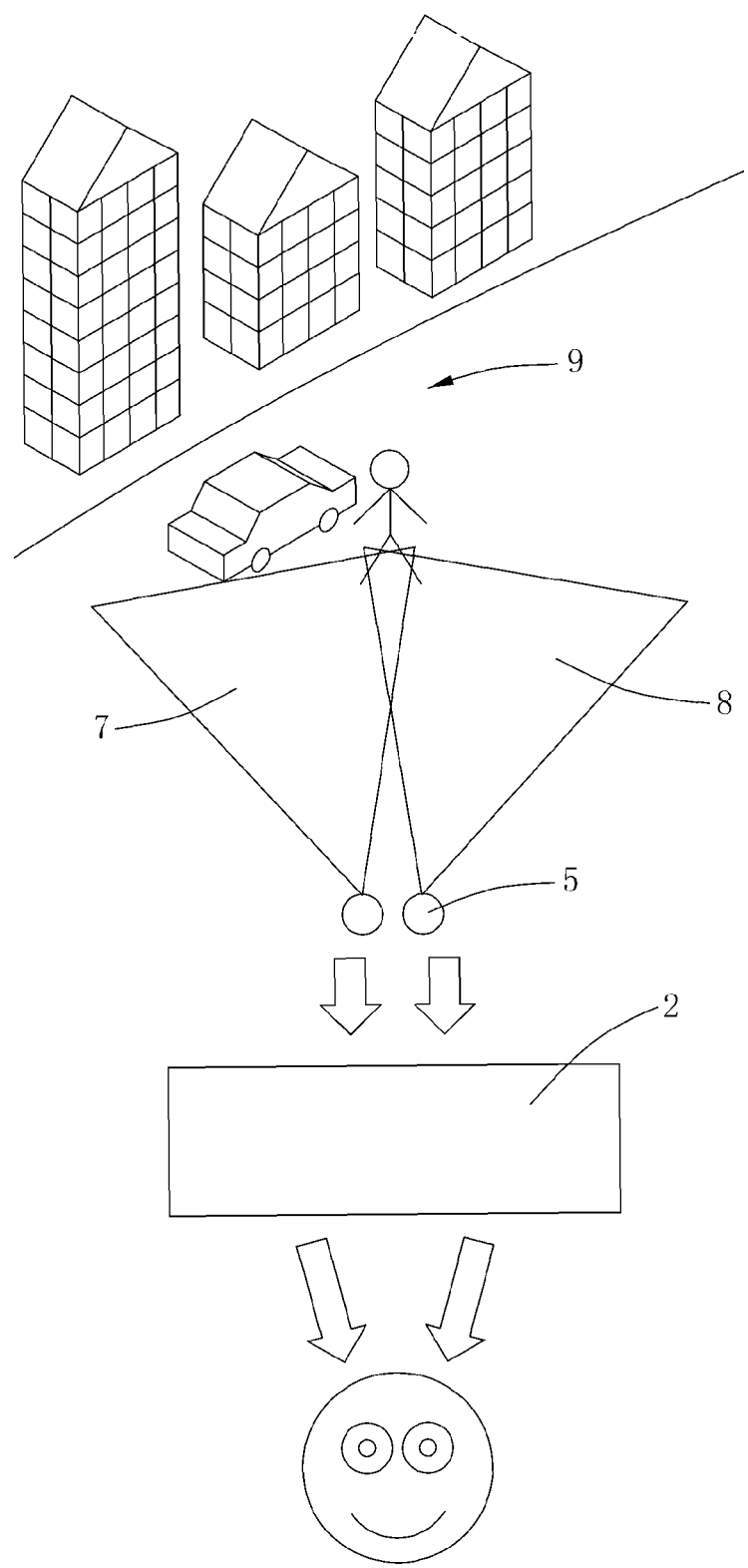
FIG. 3 schematically shows how a three-dimensional display screen respectively reflects two video sources into two eyes.

FIG. 3 schematically shows how a three-dimensional display screen reflects two video sources into two eyes respectively. As can be seen from FIG. 3, two realistic vision images are simulated on the three-dimensional display screen 2. The images are respectively reflected into the left and right eyes of the observer to obtain the same effect as the realistic vision target viewed realistically. The information on the two visual images enables human to sense a realistic three-dimensional visual image with a sense of distance after they are processed and combined in the brain. Reference sign 9 in FIG. 3 indicates the surrounding environment of vehicle filmed by the cameras, such as road conditions.

Figure 4:
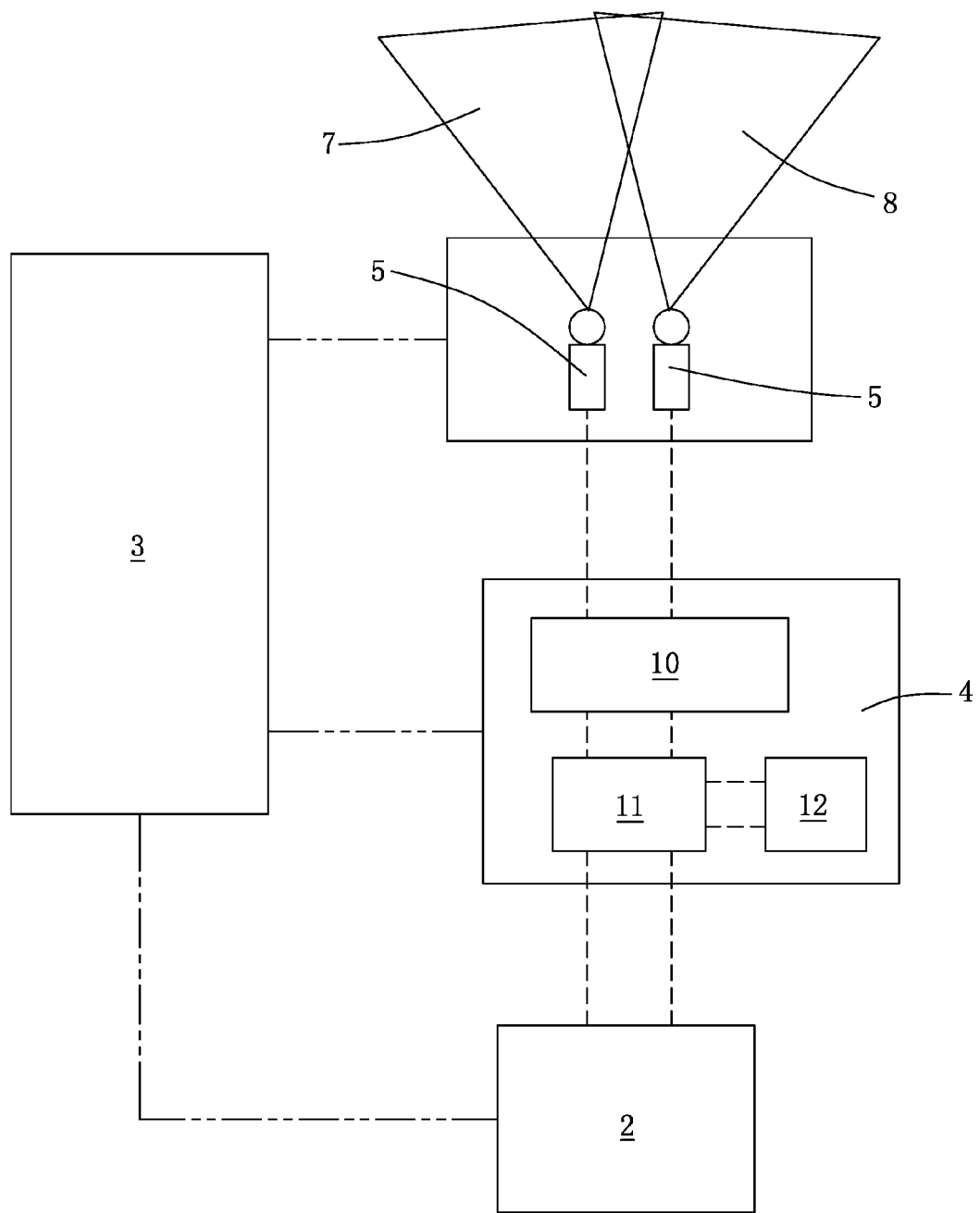
FIG. 4 is an operation principle diagram of the on-vehicle three-dimensional video system according to an embodiment of the invention.

FIG. 4 is an operation principle diagram of the on-vehicle three-dimensional video system according to the invention. With reference to FIG. 4, those skilled in the art will know about the operation principle of the on-vehicle three-dimensional video system according to the invention on the basis of the above detailed description made in connection with FIG. 1.

It will be noted that in the specification, the terms "comprise" and "include" mean that there exists the feature in question and does not preclude the existence of other technical features. In cases which are not in conflict with the recordation in the specification, the indefinite article "a" related to the number of devices or components does not preclude a plurality of devices or components. Moreover, in practical application, various variations of the technical features involved in the specification may be recombined. The particular details of structure and function disclosed herein should not be construed as limiting, but is intended only to teach those skilled in the art to make use of basic operation principle of the invention from various aspects. Moreover, while at least one exemplary embodiment has been presented in the foregoing summary and detailed description, it should be appreciated that a vast number of variations exist. It should also be appreciated that the exemplary embodiment or exemplary embodiments are only examples, and are not intended to limit the scope, applicability, or configuration in any way. Rather, the foregoing summary and detailed description will provide those skilled in the art with a convenient road map for implementing an exemplary embodiment, it being understood that various changes may be made in the function and arrangement of elements described in an exemplary embodiment without departing from the scope as set forth in the appended claims and their legal equivalents.

What is claimed is:

1. An on-vehicle three-dimensional video system for a vehicle, comprising:
   a plurality of pairs of cameras adapted to film a surrounding environment of the vehicle from different angles, each of the plurality of pairs of cameras disposed in the rear of the vehicle, and each pair of cameras comprising a first camera representing viewing from a left eye of a human and a second camera representing viewing from a right eye of the human;
   a display screen;
   a control module in communication with said plurality of cameras and said display screen; and
   a power supply device electrically connected to said plurality of cameras, the display screen, and the control module, and adapted to supply electrical power,
   wherein the control module is adapted to acquire, calculate, process, store and control video information from the plurality of cameras and transmit processed video information to the display screen so that the display screen displays a three dimensional video representation by reflecting an image from the first camera of the pair to the left eye of a driver of the vehicle and reflecting an image form the second camera of the pair to the right eye of the driver according to the video information.

2. The on-vehicle three-dimensional video system according to claim 1, wherein a distance between at least one pair of the plurality of cameras is from approximately 5 cm to approximately 8 cm.

3. The on-vehicle three-dimensional video system according to claim 1, wherein a distance between at least one pair of the plurality of cameras is approximately 6.35 cm.

4. The on-vehicle three-dimensional video system according to claim 1, wherein a distance between at least one pair of the plurality of cameras of the on-vehicle three dimensional video system is adjustable.

5. The on-vehicle three-dimensional video system according to claim 1, wherein a display on the display screen can be switched between a two-dimensional display and a three-dimensional display.

6. The on-vehicle three-dimensional video system according to claim 1, wherein a display on the display screen is adapted to switch among three-dimensional videos filmed by different pairs of the plurality of cameras.

7. The on-vehicle three-dimensional video system according to claim 1, wherein a distance between the first camera and the second camera of at least one pair of the plurality of cameras of the on-vehicle three dimensional video system is adjustable between approximately 5 cm and approximately 8 cm.

8. The on-vehicle three-dimensional video system according to claim 1, wherein the display screen is adapted to automatically display videos filmed by the plurality of cameras located in the rear of the vehicle when the vehicle is in an astern-running state.

9. The on-vehicle three-dimensional video system according to claim 1, wherein the display screen is adapted for use as a DVD display screen for an on-vehicle DVD.

10. A method of monitoring a surrounding environment of a vehicle, comprising:
   filming the surrounding environment of the vehicle from different angles using a plurality of pairs of cameras in proximity to one another, each of the plurality of pairs of cameras disposed in the rear of the vehicle, and each pair of cameras comprising a first camera representing viewing from a left eye of a human and a second camera representing viewing from a right eye of the human, wherein the first and second camera of each pair of cameras has substantially the same range of vision images outside the vehicle but from different angles;
   acquiring, calculating, processing, storing and controlling video information from the plurality of cameras using a control module by combining the images from both cameras in the pair to generate a three dimensional image; and
   transmitting processed video information to a display screen to display a three-dimensional video on the display screen according to the processed video information by reflecting an image from the first camera of the pair to the left eye of a driver of the vehicle and reflecting an image form the second camera of the pair to the right eye of the driver according to the video information.

11. The method according to claim 10, wherein a distance between the cameras in the pair is from approximately 5 cm to approximately 8 cm.

12. The method according to claim 10, wherein a distance between the cameras in the pair is approximately 6.35 cm.

13. The method according to claim 10, further comprising adjusting a distance between the cameras in the pair of the on-vehicle three dimensional video system.

14. The method according to claim 10, further comprising switching the display on the display screen between a two-dimensional display and a three-dimensional display.

15. The method according to claim 10, further comprising switching the display on the display screen among three-dimensional videos filmed by the pair of cameras.

16. The method according to claim 10, further comprising adjusting a distance between the first camera and the second camera of at least one pair of cameras of the on-vehicle three dimensional video system between approximately 5 cm and approximately 8 cm.

17. The method according to claim 10, further comprising automatically displaying videos filmed by the pair of cameras located in the rear of the vehicle when the vehicle is in an astern-running state.

18. The on-vehicle three-dimensional video system of claim 1, wherein the combining of the images of both cameras in the pair of cameras generates a three dimensional images that simulates a three dimensional image generated by a pair of human eyes.

19. The method of claim 10, wherein the wherein the combining of the images of both cameras in the pair of cameras generates a three dimensional images that simulates a three dimensional image generated by a pair of human eyes.

20. The on-vehicle three-dimensional video system according to claim 1, wherein a distance between the first camera and the second camera of at least one pair of the plurality of cameras of the on-vehicle three dimensional video system is adjustable based on different situations for adjusting quality of video output of the on-vehicle three-dimensional video system.

* * * * *